United States Patent
Brenner

(10) Patent No.: US 7,298,553 B2
(45) Date of Patent: Nov. 20, 2007

(54) ELEMENT FOR THE COMBINED SYMMETRIZATION AND HOMOGENIZATION OF A BUNDLE OF BEAMS

(75) Inventor: Karl-Heinz Brenner, Mannheim (DE)

(73) Assignee: Thomson Licesning, Boulogne-Billancourt (FR)

( * ) Notice: Subject to any disclaimer, the term of this patent is extended or adjusted under 35 U.S.C. 154(b) by 0 days.

(21) Appl. No.: 10/471,354

(22) PCT Filed: Mar. 19, 2002

(86) PCT No.: PCT/EP02/02988

§ 371 (c)(1),
(2), (4) Date: Mar. 15, 2004

(87) PCT Pub. No.: WO02/086592

PCT Pub. Date: Oct. 31, 2002

(65) Prior Publication Data

US 2004/0145809 A1    Jul. 29, 2004

(30) Foreign Application Priority Data

Mar. 20, 2001  (DE) ............................ 101 13 572
May 4, 2001    (DE) ............................ 101 21 747

(51) Int. Cl.
    *G02B 5/18*    (2006.01)
(52) U.S. Cl. .................... 359/569; 359/575; 359/19
(58) Field of Classification Search ............... 399/569, 399/566, 575, 1, 15, 19
See application file for complete search history.

(56) References Cited

U.S. PATENT DOCUMENTS

| | | | |
|---|---|---|---|
| 3,476,463 A | 11/1969 | Kreuzer | |
| 4,475,027 A | 10/1984 | Pressley | |
| 5,148,317 A | 9/1992 | Foresi | |
| 5,499,262 A * | 3/1996 | Nakata | 372/108 |
| 6,008,941 A | 12/1999 | Feldman et al. | |
| 6,356,395 B1 * | 3/2002 | Tawa et al. | 359/642 |
| 2004/0165268 A1 * | 8/2004 | Turunen | 359/558 |

FOREIGN PATENT DOCUMENTS

EP      987577      3/2000

OTHER PUBLICATIONS

Search Report Dated Jul. 31, 2002.

* cited by examiner

*Primary Examiner*—Fayez G. Assaf
(74) *Attorney, Agent, or Firm*—Joseph J. Laks; Harvey D. Fried; Patricia Verlangieri

(57) ABSTRACT

The invention relates to an element for the combined symmetrization and homogenization of a beam of rays and to a method for designing an element of this type. One object of this invention is to propose an element and a corresponding design method by means of which a beam of rays with any desired intensity distribution is shaped from a beam of rays with an inhomogeneous intensity distribution. In particular, the intention is to transform a beam of rays with an elliptical intensity distribution into one with a different elliptical intensity distribution. For this purpose, the invention provides a phase element for the simultaneous circularization and homogenization of anisotropic intensities of electromagnetic waves.

16 Claims, 3 Drawing Sheets

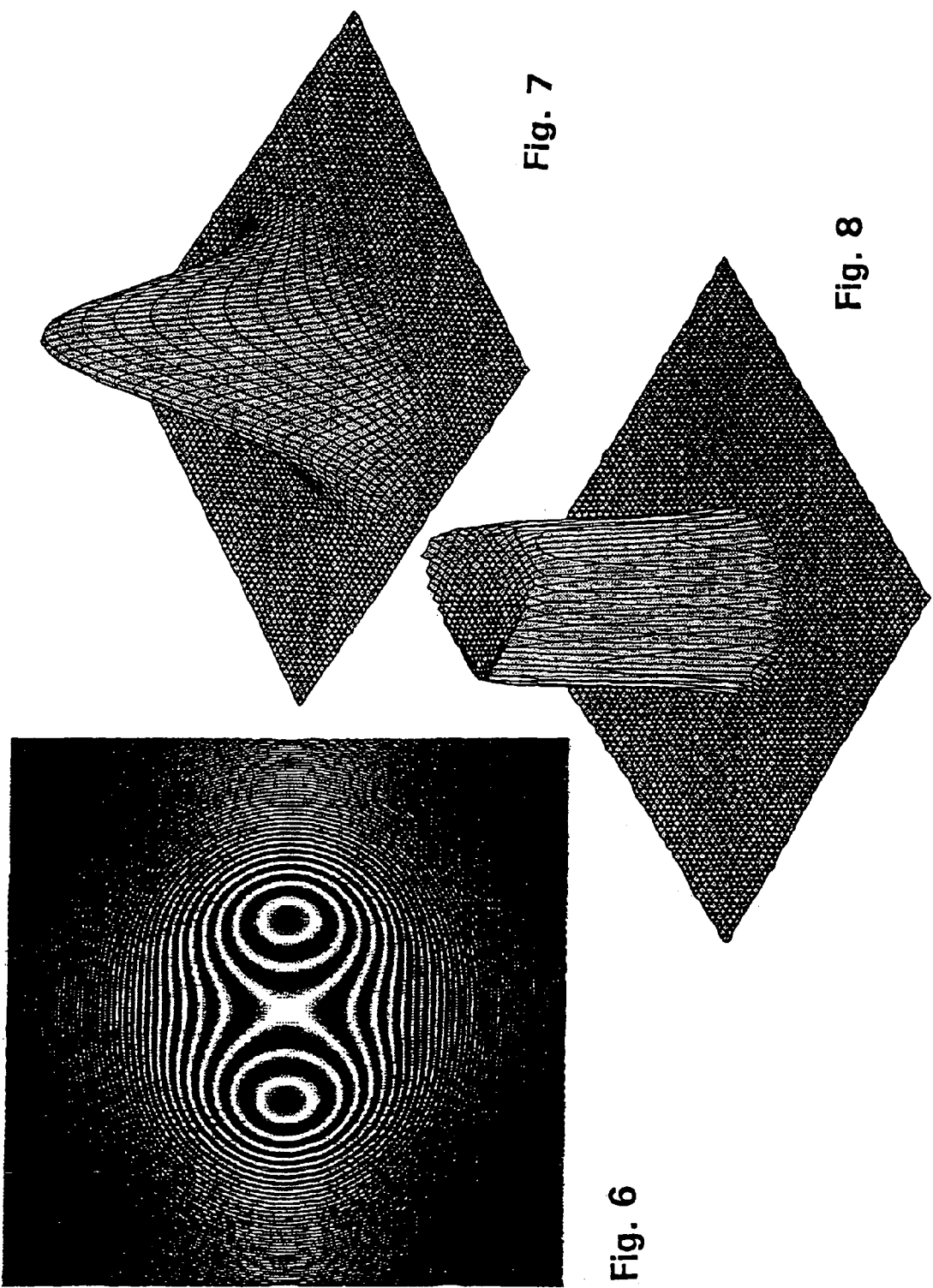

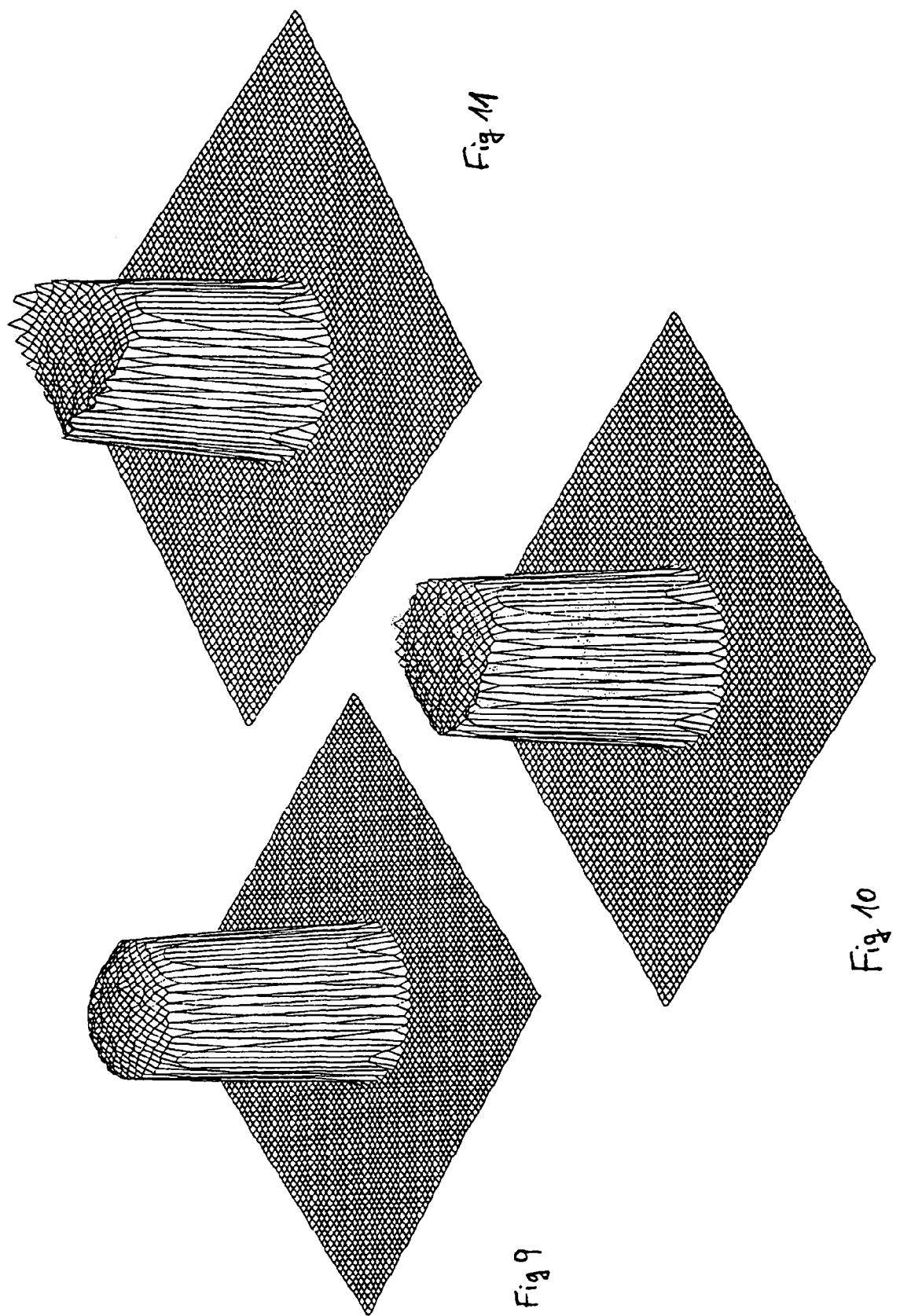

ELEMENT FOR THE COMBINED SYMMETRIZATION AND HOMOGENIZATION OF A BUNDLE OF BEAMS

Figure 1:
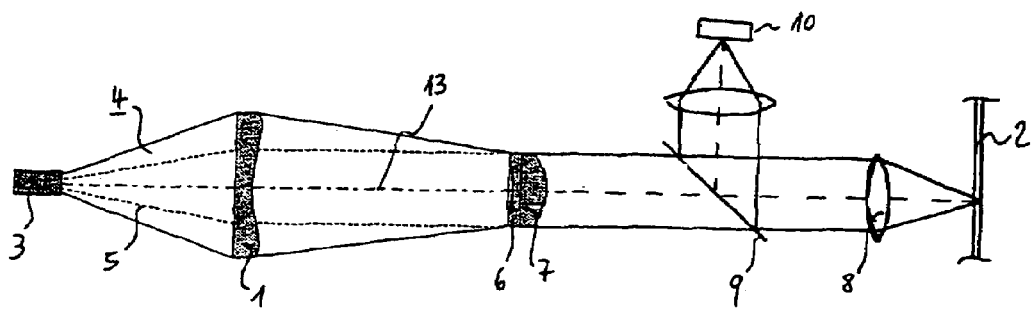

This application claims the benefit, under 35 U.S.C.§ 365 of International Application PCT/EP02/02988, filed Mar. 19, 2002, which was published in accordance with PCT Article 21(2) on Oct. 31, 2002 in German and which claims the benefit of German patent application No. 10113572.6, filed Mar. 20, 2001 and German patent application No. 10121747.1, filed May 4, 2001.

The invention relates to an element for the combined symmetrization and homogenization of a beam of rays and to a method for designing an element of this type.

In optics, the problem often arises that an existing beam of rays with an inhomogeneous intensity distribution is intended to be transformed into a beam of rays which have a different intensity distribution. Thus, owing to its origination in the resonator, the light from semiconductor lasers has a brightness distribution which greatly decreases towards the edge. One speaks of a Gaussian distribution which has the shape of a bell curve. Since the resonator is generally not symmetrical in the x-direction and y-direction, the width of the bell curve differs greatly in the two directions. The width ratio in the x- and y-directions is typically about 1:3.

In principle, diffractive and refractive methods are appropriate for what is called beam shaping. Diffractive means that the deflection of light is achieved by grating-like structures. Diffractive elements having the advantage that there are no restrictions with regard to the design and, consequently, any desired functions can be achieved. A serious disadvantage of diffractive structures is that the diffraction exhibits extreme dependence on angle and wavelength. Refractive structures achieve the deflection of rays by refraction at interfaces. This is largely independent of angle and wavelength. The design methods for refractive elements are subject to certain restrictions and are therefore resolved only for a few special cases of beam shaping.

The asymmetry of the light distribution of semiconductor lasers has previously been rectified by means of so-called astigmatic correction elements. This is referred to as symmetrization or circularization. This usually involves a combination of two cylindrical lenses arranged one behind the other. The Gaussian brightness distribution is generally not compensated, i.e. a homogenization is not performed. Where homogenization is required, it is achieved by means of spherical lens combinations or by means of beam shaping elements. The aim here is to convert the Gaussian light distribution into a so-called flat-top profile which has a flat-brightness distribution within a circular region. The combination of the functions of homogenization and symmetrization in a single refractive element has not yet been disclosed heretofore.

The known methods for symmetrization are very complicated in terms of assembly. Firstly, high-quality cylindrical lenses are required which must then be positioned in four degrees of freedom: the lens centre of the first lens must firstly be brought to the optical axis. The lens centre of the second lens must then be brought to the optical axis. The lenses must furthermore be at the correct distance from one another and be positioned at the correct angle of rotation with respect to one another.

The combination of the functions of symmetrization and homogenization would require two further degrees of freedom of positioning. 4 components would be necessary for this. Consequently, 8 interfaces occur which would have to be individually antireflection-coated in order to avoid a reflection loss of $(1.00-0.96^8=28\%)$. The antireflection coating gives rise to further colour effects.

U.S. Pat. No. 3,476,463 discloses a two-element system which transforms rays of a coherent beam of rays into a beam of rays of a different predetermined intensity distribution. This known solution has the disadvantage that it is suitable only for coherent beams of rays and for a rotationally symmetrical distribution of the initial beam of rays.

One object of this invention is to propose an element and a corresponding design method by means of which a beam of rays with any desired intensity distribution is shaped from a beam of rays with an inhomogeneous intensity distribution. In particular, the intention is to transform a beam of rays with an elliptical intensity distribution into one with a different elliptical intensity distribution.

This object is achieved as described below. The phase element according to the invention makes it possible to shape a beam of rays with an inhomogeneous intensity distribution, which is generally not rotationally symmetrical, into one with any desired intensity distribution. In this case, the radiation may be either electromagnetic radiation, in particular light, or another form of directed radiation, for example particle radiation. In this case, according to the invention, the phase element may be either a refractive phase element, which has the advantage of greater independence in respect of wavelength and angle, or a diffractive phase element, which has the advantage of greater freedom of design. The initial intensity distribution is, in particular, elliptical, while the target intensity distribution is likewise elliptical in general form. More specific variants of the target intensity distribution are rotationally symmetrical, elliptical with changed semi-axis ratio or elliptical with rotated principle axes.

In this case, the phase element is designed in such a way that it changes the density distribution of the rays of the beam of rays into the desired density distribution. Optionally, a further optical element, called correction element hereinafter, effects a parallelization of the rays of the beam of rays, if this is desired. The correction element, too, can be either of diffractive or of refractive design. Both diffractive and refractive elements are generally provided as transmission element, but a design as reflection element likewise lies within the scope of the invention.

As an example, a description is given of an optical component including design method, which, in addition to the homogenization, also performs the task of circularization. A component of this type differs measurably from components solely for homogenization; it enables simultaneous homogenization and circularization in conjunction with very little loss of light and a very small structural size.

Advantages of the invention emerge from the fact that the predominant number of semiconductor lasers are edge emitters and therefore, due to the dictates of production, have a greatly asymmetrical beam profile. This equally applies to laser arrays for pumping high-power lasers. Typically, at least two cylindrical lenses are used solely for the circularization.

The design method according to the invention for determining the phase distribution of a phase element, which converts a beam of rays of a first, in particular elliptical, distribution into one of a second elliptical distribution, comprises, according to the invention, at least two sequential transformations, of which one transformation is a meridional transformation and the others are linear transformations with a constant determinant. This may be either a single linear transformation or a sequence of a plurality of linear transformations with a constant determinant. According to the invention, complying with these conditions suffices to determine the desired phase distribution.

A preferred variant comprises, according to the invention, two sequential transformations, the first transforming equidistant radial segments to non-equidistant radial segments and the second transforming ring segments of the first distribution to ring segments of the second distribution. It is advantageous that the first transformation achieves the homogenization and provides a defined initial situation for the symmetrization achieved by the second transformation. The target distribution of the first transformation may be either a homogeneous ray density distribution or a density distribution of the rays of a beam of rays which is non-uniform but predetermined in a targeted manner. This last is also intended to be understood under the term "homogenization". In many cases, the initial distribution of the ray density will have circular or elliptical symmetry, but non-elliptical initial distributions are also transformed according to the invention, by means of the first transformation into an elliptical intermediate distribtuion. By means of the second transformation, the intermediate ray density distribution, which is a first elliptical distribution, is transformed into a second elliptical transformation, the target ray density distribution. In many cases, the second elliptical distribution is a rotationally symmetrical distribution. However, the design method according to the invention likewise makes it possible to achieve a target ray density distribution of a different elliptical symmetry, for example, with a changed semi-axis ratio or with semi-axes that are rotated in comparison with the first elliptical distribution.

The invention provides for the optical power per corresponding radial segment or ring segment to be kept constant. The size of the radial or ring segments is in each case chosen such that the optical power remains constant. This has the advantage that the quantity of light emitted by the laser is introduced into the optical system virtually in its entirety.

According to the invention, the radial extent of the target density distribution of the transformation is freely selectable. This has the advantage that, the larger its radial extent, the smaller its intensity and the smaller, correspondingly, the maximum phase deviation. This applies correspondingly conversely to a smaller radial extent. The phase element can thus be produced more simply for a large radial extent of the target ray density distribution, since the phase deviation is small. For smaller radial extents, it is possible to select a phase element of smaller diameter, for which a larger phase deviation must then be set.

According to the invention, the distance between the phase element and a plane in which the target ray density distribution is achieved is freely selectable. This has the advantage that, given a large distance, a small gradient of the phase occurs, as a result of which the phase element can be produced more cost-effectively. A further advantage is that the difference between ray-optical and wave-optical considerations given a small phase gradient is small, and, consequently, only small deviations from the ideal result are to be expected. Conversely, the distance can be chosen to be smaller, the larger the permissible gradient. This depends both on the production possibilities and on the deviations that can be tolerated.

The method proposed here reduces the number of components. This results in the following consequences: there are fewer interfaces and hence disturbances of the beam path, a lower assembly complexity is required and a lower weight is achieved.

The design method according to the invention can be described, in principle, as follows: the phase distribution of the phase element is determined as follows:
Representation of the initial ray density distribution in polar co-ordinates $(r,\phi)$
Representation of the intermediate ray density distribution in polar co-ordinates $(\rho,\psi)$
Assumption: Rays are deflected only in a meridional, not in an azimuthal direction, i.e. $\phi=\psi$
Calculation of a $\phi$-dependent first transformation function $f_\phi: r \to \rho$ such that the optical power P in corresponding radial sections is identical:

$$I_0(r,\phi)\, r\, dr\, d\phi = I_1(\rho,\phi)\rho d\rho d\phi$$

Calculation of a second transformation function which transforms a first elliptical distribution into a second elliptical distribution
From this it is impossible to determine a relationship for the derivative of the phase of the element with respect to the radius $\partial \Phi(r,\phi)/\partial r$
By integration the sought phase of the phase element is obtained.

The phase distribution of the optional correction element is determined as follows:
Wave-optical calculation of the propagation of light after the phase element up to a predetermined homogenization distance $z_H$.
As a result, the phase of the light distribution is produced at $z_H: \Phi_1(r,\phi)$
The phase of the correction element is then produced by complex conjugation: $\Phi_2(r,\phi)=\Phi_1^*(r,\phi)$.

The algorithm according to the invention can be adapted to specific tasks and ultimately yields a refractive optical structure which converts, virtually without any losses, for example, an asymmetrical Gaussian ray into a rotationally symmetrical flat-top distribution.

The invention alternatively provides for the density change to be performed in the azimuthal direction, in order to transform a Gaussian or else a non-Gaussian distribution into a representative distribution, such as, for example, a super-Gaussian distribution. As an alternative, provision is made for transforming, by means of a density change in the r- and y-directions, a rotationally symmetrical or else a non-rotationally symmetrical distribution into a distribution that is homogenous in r, $\phi$ or x, y.

The invention relates to a phase element for the simultaneous homogenization and circularization of, in particular, asymmetrical Gaussian intensity distributions and a method for calculating a phase element of this type.

Applications of the invention are beam homogenization and beam shaping for semiconductor lasers with an anisotropic intensity distribution for the illumination of optical systems, or alternatively others, such as beam shaping for materials processing of industrial and biological materials.

Special features are: what is involved is an analytical design method without approximation. The tasks of homogenization and circularization are fulfilled by a single tandem component. The prior art involves an anisotropic beam profile firstly being circularized by means of a combination of cylindrical lenses. Free parameters can be utilized according to the invention in order to optimize the producibility and adjustment tolerance. The tandem component is preferably a plane/aspherical phase element and effects a location-dependent deflection of sub-beams. As an alternative, provision is made for providing a spherical/aspherical phase element, which has the advantage of enabling a larger phase deviation and which can nevertheless be produced cost-effectively, since at least one side has a standard form. If appropriate., a double aspherical phase element is also provided, if a particularly large phase deviation or phase gradient is to be compensated. The correction element is preferably a plane/aspherical phase element which, if appropriate, is embodied in one piece, or combined with a further element, preferably a collimator. It is a certain distance from the first sub-element along the propagation direction of the beam of rays. It effects the parallel alignment of the sub-beams. The optical thickness of a finished tandem component differs measurably from that of other customary components for homogenization.

Further advantages and variants of the invention can also be gathered from the following description of exemplary embodiments. In the figures:

FIG. 1 shows an apparatus with a phase element according to the invention

Figure 2:
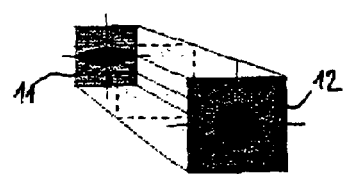
Figure 3:
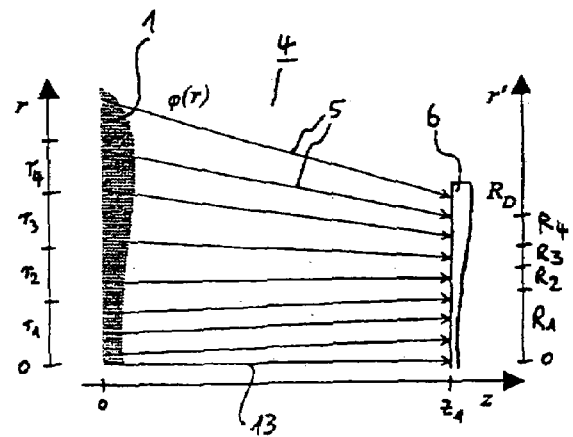
Figure 4:
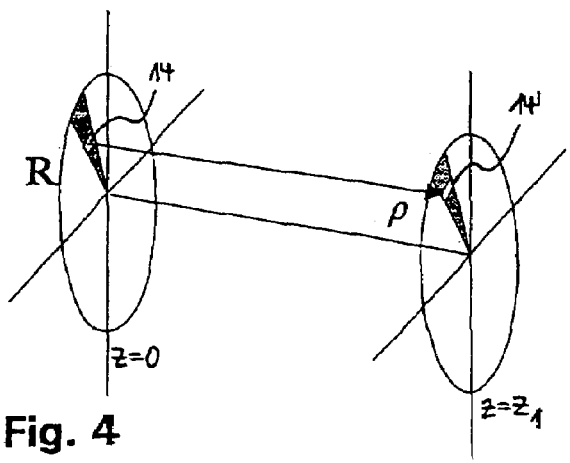
Figure 5:
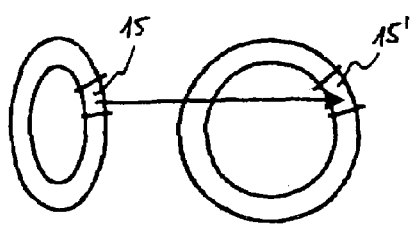

FIG. 2 shows a beam cross section before and after a phase element according to the invention FIG. 3 shows a meridional redistribution FIG. 4 shows a first transformation FIG. 5 shows a second transformation FIG. 6 shows a calculated phase distribution FIG. 7 shows an initial intensity distribution FIGS. 8-11 show a target intensity distribution FIG. 1 shows an apparatus with a phase element 1 according to the invention. The diagrammatically illustrated apparatus is an apparatus for reading from and/or writing to optical recording media 2. Apparatuses of this type are known to the person skilled in the art; therefore, only a few important elements are described. The light source used here is a semiconductor laser diode 3, which emits a divergent beam 4 of rays. It has an elliptical cross section and an inhomogeneous density distribution of individual rays 5. By means of the phase element 1, the density distribution of the beam 4 of rays is both homogenized and symmetrized, i.e., a uniform, homogeneous ray density distribution is obtained within a given cross section and the asymmetrical cross section is converted into a symmetrical, in this case rotationally symmetrical, cross section. A correction element 6 corrects the phase of the homogenized and symmetrized beam of rays. It is shown here coupled to a collimator lens 7 of the apparatus; however, both parts may also be designed in one piece. After passing through the collimator lens 7, the beam of rays is focussed by means of an objective lens 8 onto the optical recording medium 2, reflected from the latter and directed onto a photodetector 10 by a semitransparent mirror 9. The phase element 1 has different thicknesses at different locations, the rays which pass through the phase element 1 leaving the phase element 1 with a phase that has been changed differently. The phase element 1 illustrated here is illustrated as a plane/aspherical phase element. Instead of a phase element 1, it is also possible to use a grating structure whose grating lines are locally displaced in such a way as to obtain a corresponding phase change in the individual rays of the beam of rays. A grating of this type is not illustrated here; it can be operated either in transmission or in reflection.

FIG. 2 shows, in a three-dimensional illustration, at the top on the left by way of example, the elliptical beam cross section 11 as it appears before entering the phase element 1, and in the bottom right part the rotationally symmetrical beam cross section 12 as it appears after leaving the correction element 6. The dashed frame indicates the location at which the phase element 1 is arranged. This illustration does not reveal the inhomogeneous ray density of the elliptical beam cross section 11 and the homogeneous ray density of the beam cross section 12.

FIG. 3 shows the meridional redistribution of the rays 5 of the beam 4 of rays between phase element 1 and correction element 6. The illustration shows a section along the optical axis 13 for a fixed angle. The co-ordinate z is plotted along the optical axis, which co-ordinate is intended to have its zero point before the phase element 1. It is evident that the ray density for z=0 changes inhomogeneously as a function of the radius r. It is relatively high for small values of r, whereas it decreases for large values of r. Redistribution of equidistant radial sections $r_1, r_2, r_3, r_4$ to non-equidistant radial sections $R_1, R_2, R_3, R_4$ at the distance $z_1$ results in a homogeneous density distribution of the rays 5 for the fixed angle illustrated here.

FIG. 4 shows the meridional redistribution of the first transformation of the method according to the invention in a diagrammatic three-dimensional illustration. A radial segment 14 is shown as a hatched angular range for z=0 on the left, which segment is mapped onto a corresponding identical angular range for $z=z_1$, onto radial segment 14'. It is evident that here the marked radial segment 14 with r=R is mapped onto a radial segment 14' lying further outside with r=ρ.

FIG. 5 shows a diagrammatic illustration of the second transformation according to the invention, in which an ellipse segment or ring segment 15 illustrated on the left is transformed to an annular segment 15' illustrated on the right.

FIG. 6 shows a phase distribution which is calculated by the method according to the invention, in a two-dimensional illustration showing the real part. In this case, the starting point of the determination of this phase distribution is an astigmatic ratio of the semi-axes of the elliptical beam cross section 11 of 3 to 1, the semi-axes being 1.8 mm and 0.6 mm, the diameter of the phase element being 5.12 mm and the homogenization occurring at a distance z=60 mm from the phase element 1.

The initial intensity distribution is illustrated in a pseudo-3D plot in FIG. 7. The inhomogeneous intensity distribution is evident, which, moreover is not rotationally symmetrical.

FIG. 8 shows the calculated target intensity distribution, which has essentially circular symmetry and has sharply falling edges. What is involved in this case is a very good so-called flat-top-distribution, which has slight deviations from the otherwise homogeneous intensity distribution only in edge regions. These slight deviations are due inter alia to the fact that the present calculation is effected ray-optically, while certain deviations result wave-optically in respect thereof. However, this is insignificant in particular in the case of the apparatus according to the invention for reading from and/or writing to optical recording media from FIG. 1, since in this case an outer region of the flat-top profile can perfectly well be masked out. In particular in the event of follow-up of the objective lens 8 for tracking purposes, the latter is deflected perpendicularly to the optical axis 13. Deflection and shadowing are advantageously coordinated with one another in such a way that a region of the flat-top profile which is as uniform as possible is focussed onto the recording medium 2 as far as possible in the entire deflection region.

It has been shown that an even better flat-top distribution is obtained if the calculation is carried out with slightly deviating Gaussian parameters. Thus, an optimized flat-top distribution is produced for an elliptical initial ray distribution with Gaussian parameters of 820 µm and 1550 µm if slightly altered Gaussian parameters of 800 µm and 1600 µm are used for the calculation. FIGS. 9-11 show simulations for a constant first Gaussian parameter of 800 µm and actually existing Gaussian parameters of 800 µm and 1600 µm, the second Gaussian parameter having been varied for the simulation. 800 µm and 1450 µm were used for FIG. 9, 800

μm and 1500 μm. for FIG. 10, and 800 μm and 1550 μm for FIG. 11. It is evident that the flat-top distribution in accordance with FIG. 10 is the one which comes nearest to the target. A further optimization can be achieved by varying the first Gaussian parameter.

The design method according to the invention is explained below, with reference to the figures described, for the case of an elliptical, Gaussian initial ray density distribution and a rotationally symmetrical flat-top target distribution. The Gaussian illumination intensity is described by $$I_0(r,\phi) = e^{-2A(\phi)r^2} \tag{1}$$

where $$A(\varphi) = \left(\frac{\cos\varphi}{\sigma_x}\right)^2 + \left(\frac{\sin\varphi}{\sigma_y}\right)^2 \tag{2}$$

takes account of the elliptical Gaussian width.

The rotationally symmetrical flat-top target distribution can be represented by $$I_1(\rho) = \begin{cases} \alpha & \text{for } \rho < \rho_{\max} \\ 0 & \text{otherwise} \end{cases} \tag{3}$$

The intensity factor α follows from the conservation of the total power and is accordingly linked to the angle-dependent radius of the flat-top distribution.

$$\alpha = \frac{1}{2\rho_{\max}^2(\varphi)A(\varphi)} \tag{4}$$

Since the total power differs in each angular segment φ of the initial intensity distribution, the flat-top radius is dependent on angle given a constant α.

For the first step, the homogenization by meridional redistribution, an angular segment δφ at z=0 in FIG. 3 is mapped onto the same angular segment in the target plane, that is to say z=z₁ in FIG. 3. In accordance with ray optics, the redistribution is done only in the radial direction:

$$\rho(r) = r + \frac{z\partial\phi}{k\partial r} \tag{5}$$

In this case, r is the source co-ordinate, z is the distance between the optical phase element ø(r̄) and the screen, where the transformed distribution is observed. This corresponds to the correction element 6 in FIG. 3. The light-wavelength-dependent quantity k=2π/λ is called the wave number.

The conservation of the power in each r,φ segment requires that the following holds true:

$$\int_0^r I_0(r',\varphi)r'\,dr' = \int_0^{\rho(r,\varphi)} I_1(\rho',\varphi)\rho'\,d\rho' \tag{6}$$

The angular element dφ is the same on both sides and has therefore been cancelled.

This equation is solved closed according to ρ(r,φ):

$$\rho(r,\varphi) = \rho_{\max}(\varphi)\sqrt{1 - e^{-2A(\varphi)r^2}} \tag{7}$$

owing to the limitation to meridional redistribution, the phase could be determined from equation (5) directly by radial integration. However, the element would transform an elliptical Gaussian distribution into a corresponding elliptical flat-top distribution with radius $$\rho_{\max}(\varphi) = \sqrt{\frac{1}{2\alpha A(\varphi)}}.$$

In the second step, therefore, a further co-ordinate transformation is introduced according to the invention. The further description will now be made in a two-dimensional fashion, since the entire transformation thereby becomes non-meridional.

In this representation, the first transformation reads:

$$T_1: \begin{pmatrix} r\cdot\cos\varphi \\ r\cdot\sin\varphi \end{pmatrix} \rightarrow \begin{pmatrix} \rho(r,\varphi)\cdot\cos\varphi \\ \rho(r,\varphi)\cdot\sin\varphi \end{pmatrix} \tag{8}$$

with ρ(r,φ) from equation (7). The objective of the second transformation is to transform the elliptical flat-top distribution into a rotationally symmetrical distribution. This is achieved by the following transformation:

$$T_2: \begin{pmatrix} x \\ y \end{pmatrix} \rightarrow \begin{pmatrix} x \\ y\dfrac{\sigma_x}{\sigma_y} \end{pmatrix} \tag{9}$$

The transformation $T_2$ is linear and represents an expansion or compression in the y-direction, depending on the value of the factor $\sigma_x/\sigma_y$. It is written as a matrix as follows:

$$T_2 = \begin{pmatrix} 1 & 0 \\ 0 & \dfrac{\sigma_x}{\sigma_y} \end{pmatrix} \tag{10}$$

$T_2$ is a linear transformation with location-invariant metric; the determinant $$\det(T_2) = 1 * \frac{\sigma_x}{\sigma_y} - 0 = const$$

does not depend on x or y. The following holds true for a plurality of transformations $T_2, \ldots, T_N$: all transformations of the form $T_1.T_2 \ldots T_N$ are the subject-matter of the method according to the invention if $T_1$ is a meridional transformation and $T_2, \ldots, T_N$ are linear transformations with the property det($T_2$* ... *$T_N$)=const.

Example: $T_2=T_{21}*T_{22}$ where $$T_{21} = \begin{pmatrix} 1 & 0 \\ 0 & \sigma_x \end{pmatrix}; T_{22} = \begin{pmatrix} 1 & 0 \\ 0 & 1/\sigma_y \end{pmatrix}$$

The product transformation $T_1.T_2$ can be combined in the case considered here in accordance with equations (9) and (10) to give the non-meridional total transformation $$T: \vec{r} = \begin{pmatrix} r\cdot\cos\phi \\ r\cdot\sin\phi \end{pmatrix} \rightarrow \vec{\rho}_2 = \begin{pmatrix} \rho_2\cdot\cos\psi \\ \rho_2\cdot\sin\psi \end{pmatrix} \quad (11)$$

with the following relationships:

$$\rho_2 = \sigma_x\sqrt{\frac{1-e^{-2A(\varphi)r^2}}{2\alpha}}, \quad \psi = \text{atan}\left(\frac{\sigma_x}{\sigma_y}\tan(\varphi)\right) \quad (12)$$

The determination of the optical phase is based on the two-dimensional vectorial relationship $$\vec{\rho}_2 = \vec{r} + \frac{z}{k}\vec{\nabla}\phi \quad (13)$$

Using the representation of the gradient in polar co-ordinates $$\vec{\nabla}\phi = \frac{\partial\phi}{\partial r}\vec{e}_r + \frac{1}{r}\frac{\partial\phi}{\partial r}\vec{e}_\varphi \quad (14)$$

with equation (13) the following partial derivatives hold true:

$$\frac{\partial\phi}{\partial r} = \frac{k}{z}(\vec{\rho}_2-\vec{r})\vec{e}_r, \frac{\partial\phi}{\partial \varphi} = \frac{kr}{z}(\vec{\rho}_2-\vec{r})\vec{e}_\varphi \quad (15)$$

The phase is determined in the two-dimensional case by integration over a path:

$$\phi(r,\varphi) = \int_{Path} \vec{\nabla}\phi d\vec{s} \quad (16)$$

This integral is distance-independent; therefore, a path of $r=0$ in the radial direction is chosen. The phase is determined from the integral $$\phi(r,\varphi) = \frac{k}{z}\int_0^r \rho_2(r',\varphi)\cos(\psi(r',\varphi)-\varphi)dr' - \frac{kr^2}{2z} \quad (17)$$

In this case r and φ are the polar co-ordinates location $z=0$ of the phase element, k and z are as already described according to equation (5).

The height distribution of the phase element 1 is determined by the formula $$\phi(R,\phi)=k\cdot\Delta n\cdot h(R,\phi) \quad (18)$$

In this case, $h(R,\phi)$ is the height of the phase elements in polar co-ordinates, k is the wave number and Δn is the difference in refractive index at the boundary of the phase element. It is evident that, both in formula (19) and in formula (20) the wavelength dependence over the wave number k is omitted in the determination of the height distribution profile of the phase element 1. A slight wavelength dependence can occur only over the difference in refractive index Δn; however, the said wavelength dependence is unimportant for the application of beam shaping of semiconductor laser light.

A phase element according to the invention transforms a beam of rays with a first arbitrary inhomogeneous intensity distribution $I_0$, which is neither one-dimensional nor rotationally symmetrical, into a beam of rays with a second inhomogeneous intensity distribution $I_1$. In this case, the transformation of source locations ($x_0$, $y_0$) of the first intensity distribution $I_0$ into target locations ($x_1$, $y_1$) of the second intensity distribution $I_1$ of the beam of rays can be represented as a successive execution of a one-dimensional transformation TE or a rotationally symmetrical transformation TR and a linear transformation TL.

In this case, the rotationally symmetrical transformation TR has the general form $$TR: \begin{pmatrix} x_0 \\ y_0 \end{pmatrix} \mapsto \begin{pmatrix} x_1 \\ y_1 \end{pmatrix} \text{ with } \begin{pmatrix} x_1 \\ y_1 \end{pmatrix} = T\begin{pmatrix} r(x_0,y_0)\cos\varphi(x_0,y_0) \\ r(x_0,y_0)\sin\varphi(x_0,y_0) \end{pmatrix} \quad (19)$$

where T is a linear transformation, $$\varphi = \arctan\left(\frac{y_0}{x_0}\right)$$

is the polar angle of the source location ($x_0$, $y_0$), and r is calculated in accordance with the relationship known for rotationally symmetrical distributions $$r(r_0,\phi)=P_2^{-1}(P_1(r_0,\phi),\phi) \quad (20)$$

where $$P_j(r,\varphi) \int_0^r \int_\varphi^{\varphi+\Delta\varphi} I_j(\hat{r},\hat{\varphi})\hat{r}d\hat{r}d\hat{\varphi}, j=\{0,1\} \quad (21)$$

is the angle-dependent power in an infinitesimal segment Δφ of the arbitrary intensity distributions $I_0$, $I_1$.

The one-dimensional transformation TE has the general form $$TE: \begin{pmatrix} x_0 \\ y_0 \end{pmatrix} \mapsto \begin{pmatrix} x_1 \\ y_1 \end{pmatrix} \text{ with } \begin{pmatrix} x_1 \\ y_1 \end{pmatrix} = T\begin{pmatrix} f(x_0) \\ g(y_0) \end{pmatrix} \quad (22)$$

where T is a linear transformation and f and g are calculated in accordance with the relationship known for one-dimensional distributions $$f(x)=P_2^{-1}(P_1(x_0))$$

$$g(y)=Q_2^{-1}(Q_1(y_0)). \quad (23)$$

Here $P_j(x)$ and $Q_j(x)$ according to, $$P_j(x) = \int_0^x I_{x,j}(\hat{x})d\hat{x} \qquad (24)$$
$$Q_j(y) = \int_0^y I_{y,j}(\hat{y})d\hat{y}, \quad j=\{0,1\}$$

are the partial powers of the separable arbitrary intensity distributions $$I_j(x,y)=I_{x,j}(x)\cdot I_{y,j}(y), j=\{0,1\} \qquad (25)$$

A phase element according to the invention may be realized either as a refractive phase element or as a reflective element or as a holographic element.

The height distribution of a refractive phase element according to the invention is determined by the path integral $$h(x_0, y_0) = \frac{1}{z(n-1)}\int_0^{\vec{r}_0}\left[\begin{pmatrix} x_1(\hat{x}_0, \hat{y}_0) \\ y_1(\hat{x}_0, \hat{y}_0) \end{pmatrix} - \hat{r}_0\right]d\vec{s}, \hat{r}_0 = \begin{pmatrix} \hat{x}_0 \\ \hat{y}_0 \end{pmatrix}. \qquad (26)$$

In this case, z is the distance between the planes with the predetermined intensity distributions $I_0$ and $I_1$, and n is the refractive index of the phase element.

The height distribution of a reflective element according to the invention is determined by the path integral $$h(x_0, y_0) = \frac{1}{-2z}\int_0^{\vec{r}_0}\left[\begin{pmatrix} x_1(\hat{x}_0, \hat{y}_0) \\ y_1(\hat{x}_0, \hat{y}_0) \end{pmatrix} - \hat{r}_0\right]d\vec{s}, \hat{r}_0 = \begin{pmatrix} \hat{x}_0 \\ \hat{y}_0 \end{pmatrix}. \qquad (27)$$

In this case, here as well z is the distance between the planes with the predetermined intensity distributions $I_0$ and $I_1$.

The phase distribution ø of a holographic element according to the invention is determined by the-path integral $$\phi(x_0, y_0) = \frac{k}{z}\int_0^{\vec{r}_0}\left[\begin{pmatrix} x_1(\hat{x}_0, \hat{y}_0) \\ y_1(\hat{x}_0, \hat{y}_0) \end{pmatrix} - \hat{r}_0\right]d\vec{s}, \hat{r}_0 = \begin{pmatrix} \hat{x}_0 \\ \hat{y}_0 \end{pmatrix}. \qquad (28)$$

Here as well z is the distance between the planes with the predetermined intensity distributions $I_0$ and $I_1$, while k is the wave number.

What is novel about this invention is the combination of two functions in a single element. What is also novel, in particular, is the design method, which, within limits, allows arbitrary brightness profiles to be converted into new, desired profiles.

The advantage of the invention is immediately apparent from the disadvantage of the previous methods. Since the element already combines different functions within itself, the assembly complexity is significantly reduced. The element can be used beneficially wherever a homogeneous light distribution is required for the application. This is the case not only for the so-called pickup (the read/write head) in optical storage but also in illumination technology or in the case of laser welding.

The invention claimed is:

1. Phase element for transforming a beam of rays with an elliptical Gaussian intensity distribution into a beam of rays with a homogeneous rotationally symmetrical intensity distribution, wherein the transformation of source locations of the elliptical Gaussian intensity distribution into target locations of the homogeneous rotationally symmetrical intensity distribution of the beam of rays can be represented as a successive execution of a one-dimensional or rotationally symmetrical transformation and a linear transformation.

2. Phase element according to claim 1, wherein the rotationally symmetrical transformation has the form $$TR: \begin{pmatrix} x_0 \\ y_0 \end{pmatrix} \mapsto \begin{pmatrix} x_1 \\ y_1 \end{pmatrix} \text{ with } \begin{pmatrix} x_1 \\ y_1 \end{pmatrix} = T\begin{pmatrix} r(x_0, y_0)\cos\varphi(x_0, y_0) \\ r(x_0, y_0)\sin\varphi(x_0, y_0) \end{pmatrix}$$

where T is a linear transformation, $$\varphi = \arctan\left(\frac{y_0}{x_0}\right)$$

is the polar angle of the source location, and r is calculated in accordance with the relationship known for rotationally symmetrical distributions $$r(r_0,\phi)=P_1^{-1}(P_0(r_0,\phi),\phi)$$

where $$P_j(r, \varphi) = \int_0^r \int_\varphi^{\varphi+\Delta\varphi} I_j(\hat{r}, \hat{\varphi})\hat{r} \, d\hat{r} \, d\hat{\varphi}, \, j=\{0,1\}$$

is the angle-dependent power in an infinitesimal segment $\Delta\phi$ of the arbitrary intensity distributions $I_0$, $I_1$.

3. Phase element according to claim 1, wherein the one-dimensional transformation has the form $$TE: \begin{pmatrix} x_0 \\ y_0 \end{pmatrix} \mapsto \begin{pmatrix} x_1 \\ y_1 \end{pmatrix} \text{ with } \begin{pmatrix} x_1 \\ y_1 \end{pmatrix} = T\begin{pmatrix} f(x_0) \\ g(y_0) \end{pmatrix}$$

where T is a linear transformation and f and g are calculated in accordance with the relationship known for one-dimensional distributions $$f(x)=P_2^{-1}(P_1(X_0))$$

$$g(y)=Q_2^{-1}(Q_1(Y_0))$$

where $$P_j(x) = \int_0^x I_{x,j}(\hat{x})d\hat{x} \qquad , j=\{0,1\}$$
$$Q_j(y) = \int_0^y I_{y,j}(\hat{y})d\hat{y}$$

are the partial powers of the separable arbitrary intensity distributions $$I_j(x,y)=I_{x,j}(x)\cdot I_{y,j}(y), j=\{0,1\}.$$

4. Phase element according to claim 1, wherein it is designed as a refractive phase element, or as a reflective element or as a holographic element.

5. Refractive phase element according to claim 4, wherein its height distribution is determined by the path integral $$h(x_0, y_0) = \frac{1}{z(n-1)} \int_0^{\hat{r}_0} \left[ \begin{pmatrix} x_1(\hat{x}_0, \hat{y}_0) \\ y_1(\hat{x}_0, \hat{y}_0) \end{pmatrix} - \hat{r}_0 \right] d\bar{s}, \quad \hat{r}_0 = \begin{pmatrix} \hat{x}_0 \\ \hat{y}_0 \end{pmatrix}$$

where z is the distance between the planes with the predetermined intensity distributions $I_0$ and $I_1$ and n is the refractive index of the phase element.

6. Reflective element according to claim 4, wherein its height distribution is determined by the path integral $$h(x_0, y_0) = \frac{1}{-2z} \int_0^{\hat{r}_0} \left[ \begin{pmatrix} x_1(\hat{x}_0, \hat{y}_0) \\ y_1(\hat{x}_0, \hat{y}_0) \end{pmatrix} - \hat{r}_0 \right] d\bar{s}, \quad \hat{r}_0 = \begin{pmatrix} \hat{x}_0 \\ \hat{y}_0 \end{pmatrix}$$

where z is the distance between the planes with the predetermined intensity distributions $I_0$ and $I_1$.

7. Holographic element according to claim 4, wherein its phase distribution is determined by the path Integral $$\phi(x_0, y_0) = \frac{k}{z} \int_0^{\hat{r}_0} \left[ \begin{pmatrix} x_1(\hat{x}_0, \hat{y}_0) \\ y_1(\hat{x}_0, \hat{y}_0) \end{pmatrix} - \hat{r}_0 \right] d\bar{s}, \quad \hat{r}_0 = \begin{pmatrix} \hat{x}_0 \\ \hat{y}_0 \end{pmatrix}$$

where z is the distance between the planes with the predetermined intensity distributions $I_0$ and $I_1$, and k is the wave number.

8. Apparatus for illuminating an optical component with a predetermined intensity distribution having a phase element according to claim 1.

9. Apparatus according to claim 8, wherein it has a correction element for parallelization.

10. Apparatus for reading from and/or writing to optical recording media having a phase element according to claim 1.

11. Apparatus according to claim 10, wherein it has a correction element for parallelization.

12. Design method for determining the phase distribution of a phase element, which converts a beam of rays of an elliptical Gaussian ray density distribution into one of a homogeneous rotationally symmetrical ray density distribution, wherein at least two sequential transformations are performed, the first transformation being a meridional transformation and the further transformation being a linear transformation with a constant determinant.

13. Design method according to claims 12, wherein the radial extent of the objective function of the transformation is freely selectable.

14. Design method for determining the phase distribution of a phase element, which converts a beam of rays of an elliptical Gaussian ray density distribution into one of a homogeneous rotationally symmetrical ray density distribution, wherein two sequential transformations are performed, the first transformation transforming equidistant radial segments to non-equidistant radial segments and the second transformation transforming ring segments of a first elliptical distribution to ring segments of the homogeneous rotationally symmetrical distribution.

15. Design method according to claim 14, wherein the optical power per corresponding radial segment or ring segment remains constant.

16. Design method according to claim 15, wherein the distance between the phase element and a plane, in which the objective function is achieved, is freely selectable.

* * * * *